United States Patent
Yamagami

(10) Patent No.: US 8,595,552 B2
(45) Date of Patent: Nov. 26, 2013

(54) RESET METHOD AND MONITORING APPARATUS

(75) Inventor: Yoshihito Yamagami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 181 days.

(21) Appl. No.: 13/355,009

(22) Filed: Jan. 20, 2012

(65) Prior Publication Data
US 2012/0124420 A1 May 17, 2012

Related U.S. Application Data

(63) Continuation of application No. PCT/JP2009/063827, filed on Aug. 4, 2009.

(51) Int. Cl.
*G06F 11/00* (2006.01)

(52) U.S. Cl.
USPC .................................. 714/23; 714/41; 714/45

(58) Field of Classification Search
None
See application file for complete search history.

(56) References Cited

U.S. PATENT DOCUMENTS

| | | | | |
|---|---|---|---|---|
| 5,251,227 A * | 10/1993 | Bruckert et al. | ................. | 714/23 |
| 5,533,193 A * | 7/1996 | Roscoe | ............................ | 714/39 |
| 5,600,785 A * | 2/1997 | Potter | ............................. | 714/23 |
| 5,768,496 A * | 6/1998 | Lidgett et al. | .................... | 714/25 |
| 7,610,482 B1 * | 10/2009 | Lok | .................................... | 713/2 |
| 7,631,224 B2 * | 12/2009 | Oguma | ........................... | 714/37 |
| 8,127,179 B2 * | 2/2012 | Carter et al. | ..................... | 714/23 |
| 8,527,810 B1 * | 9/2013 | Carter et al. | ..................... | 714/23 |
| 2007/0168740 A1 * | 7/2007 | Nilsson et al. | .................. | 714/38 |
| 2009/0044051 A1 * | 2/2009 | Nellitheertha | .................. | 714/19 |
| 2009/0300432 A1 * | 12/2009 | Yokokura | ........................ | 714/48 |
| 2010/0211824 A1 * | 8/2010 | Agrawal et al. | ................. | 714/23 |
| 2011/0004780 A1 * | 1/2011 | Hirata | ............................... | 714/2 |

FOREIGN PATENT DOCUMENTS

| | | |
|---|---|---|
| JP | 1-159739 | 6/1989 |
| JP | 8-212113 | 8/1996 |
| JP | 9-330253 | 12/1997 |
| JP | 2002-99357 | 4/2002 |

OTHER PUBLICATIONS

International Search Report for PCT/JP2009/063827 mailed Nov. 2, 2009.
MPC8379E PowerQUICC II Pro Integrated Host Processor Family Reference Manual, Feb. 2009, 1643pgs.

* cited by examiner

*Primary Examiner* — Gabriel Chu
(74) *Attorney, Agent, or Firm* — Staas & Halsey LLP

(57) ABSTRACT

A reset method performs a software reset in a state in which data in a volatile memory is retained, when an abnormality is generated in a monitoring apparatus. Hardware of the monitoring apparatus may include a function to perform a hardware reset in a state in which the data in the volatile memory is retained, but the software reset is performed with respect to the hardware that does not include such a hardware reset function. The volatile memory may store control information for controlling a host computer monitored by the monitoring apparatus, in addition to data including fault check materials to be retained when the fault is generated. The monitoring apparatus may read the fault information from the hardware to judge whether an abnormal value is reached.

10 Claims, 7 Drawing Sheets

RESET METHOD AND MONITORING APPARATUS

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2009/063827 filed on Aug. 4, 2009, in the Japanese Patent Office, the disclosure of which is hereby incorporated by reference.

FIELD

The present invention relates to a reset method to reset a monitoring apparatus while retaining a hardware state, and to a monitoring apparatus that uses such a reset method. The present invention also relates to a computer program for causing a computer to execute the reset method, and to a computer-readable storage medium that stores such a computer program.

BACKGROUND

When an abnormality is generated in a host computer, a hardware reset is performed. A general hardware reset resets the entire system board including a core of a processor, such as a CPU (Central Processing Unit), and peripheral processors, such as a memory controller and a LAN (Local Area Network) controller, in order to set each part on the system board that forms the host computer to an initial state. Fault information, such as a trace (or an operation log) used for fault analysis, is frequently changed and is stored in a volatile memory for this reason. However, when the volatile memory is set to the initial state by the hardware reset, the volatile memory will not be refreshed and data stored in the volatile memory will be destroyed.

In addition, one example of a method of retaining the fault information causes a monitoring apparatus, which may be called a SVP (SerVice Processor), to execute a memory dump in place of the host computer in which the abnormality is generated. However, when the abnormality is generated in the SVP itself, the SVP itself may not retain the fault information. For this reason, when the fault is generated in the SVP, the cause of the fault must be specified by obtaining materials for the fault check from the SVP and analyzing the materials. The fault refers to a situation in which an OS (Operating System) of the SVP, such as a Linux (registered trademark) OS, executes a panic reboot.

Conventionally, there are cases in which the fault information related to the fault generated in the SVP may not be acquired. More particularly, when the OS of the SVP executes the panic reboot and the SVP is thereafter rebooted, the data such as the fault information stored in the volatile memory may be destroyed, because the retaining of the data in the volatile memory is not guaranteed.

In the case of a general-purpose computer, a backup of the data stored in the volatile memory is retained in a nonvolatile memory or a hard disk drive. However, the SVP in many cases may not be provided with the expensive, nonvolatile memory or the hard disk drive in order to minimize the cost. Even in a case in which the nonvolatile memory is provided in the SVP, the nonvolatile memory may have an extremely limited storage capacity. For this reason, in the SVP, the data must be retained in the volatile memory. While there are demands to retain data that may be rewritten a large number of times in the volatile memory and to make the data accessible even after rebooting of the SVP, there are also demands to retain the data stored in the volatile memory so that the data stored in the volatile memory may be erased when the power is turned OFF but the data will not be destroyed by the rebooting of the SVP.

According to the conventional monitoring apparatus, when the abnormality is generated in the monitoring apparatus and the hardware reset is performed, the data such as the fault information stored in the volatile memory is destroyed by the rebooting of the monitoring apparatus.

SUMMARY

Accordingly, it is an object in one aspect of the embodiment to provide a reset method and a monitoring apparatus that may set the monitoring apparatus to a reset state using only software, without using the hardware reset function.

According to one aspect of the present invention, a reset method to reset a monitoring apparatus that is configured to monitor a host computer and includes a volatile memory configured to store data, including fault check materials and control information for controlling the host computer, may cause a processor core of the monitoring apparatus to execute a procedure, the procedure including controlling, to a disabled state, hardware within the monitoring apparatus having a possibility of performing an erroneous operation during a software reset in which the processor core is reset but the volatile memory is not reset when an abnormality is generated within the monitoring apparatus; executing the software reset which initializes only registers used by the processor core by masking an interrupt from the hardware; initializing the volatile memory when a hardware reset of the monitoring apparatus is performed; skipping initializing of the volatile memory when the hardware is in an enabled state and the software reset is performed; and rebooting a processor program that executes a process to realize a monitoring function of the monitoring apparatus.

According to another aspect of the present invention, a monitoring apparatus may include a processor core configured to monitor a host computer; and a volatile memory configured to store data including fault check materials obtained by monitoring the host computer by the processor core, and control information to control the host computer, wherein the processor core controls, to a disabled state, hardware within the monitoring apparatus having a possibility of performing an erroneous operation during a software reset in which the processor core is reset but the volatile memory is not reset when an abnormality is generated within the monitoring apparatus; executes the software reset which initializes only registers used by the processor core by masking an interrupt from the hardware; initializes the volatile memory when a hardware reset of the monitoring apparatus is performed; skips initializing of the volatile memory when the hardware is in an enabled state and the software reset is performed; and reboots a processor program that executes a process in order to realize a monitoring function of the monitoring apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
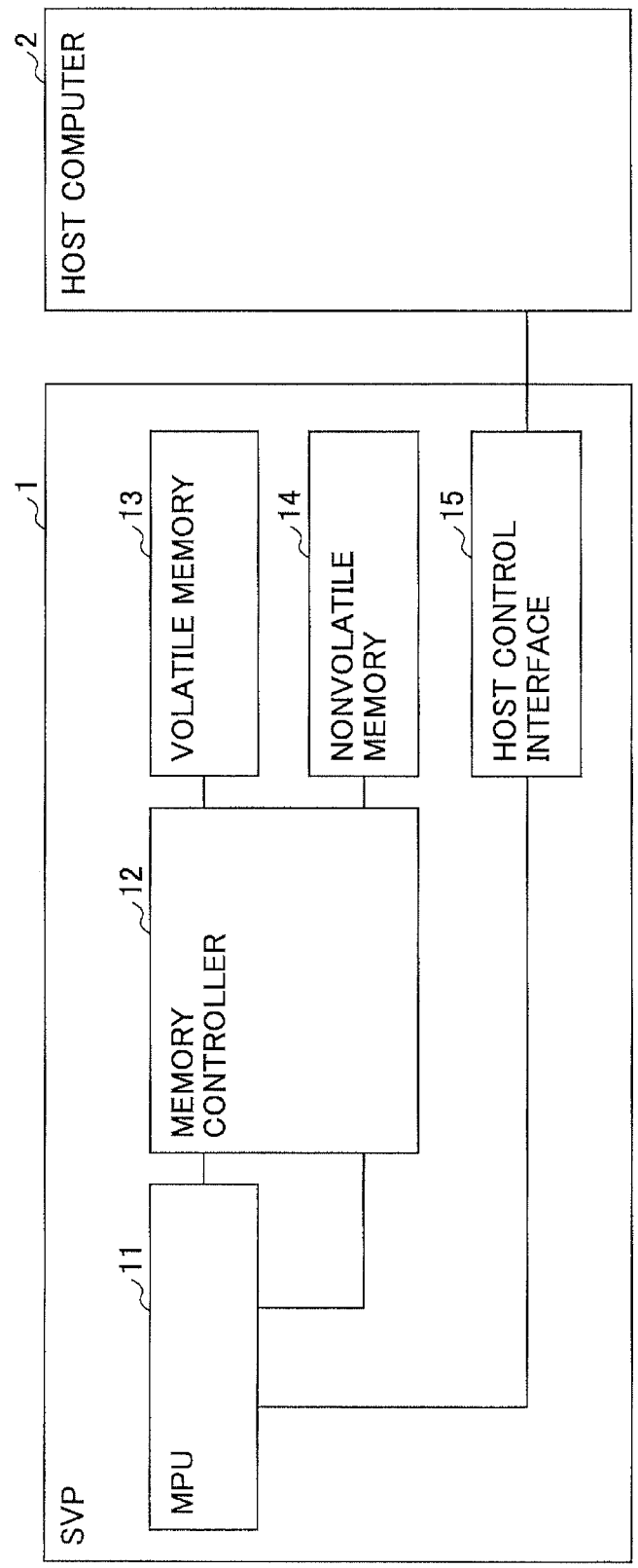
FIG. 1 is a block diagram illustrating a monitoring apparatus and a host computer in an embodiment of the present invention.

Preferred embodiments of the present invention will be described with reference to the accompanying drawings.

According to the disclosed reset method and monitoring apparatus, when an abnormality is generated in the monitoring apparatus, a software reset is performed in a state in which data stored in a volatile memory is retained. Depending on hardware of the monitoring apparatus, the hardware may include a function to perform a hardware reset in a state in which the data stored in the volatile memory is retained. However, the software reset is performed with respect to the hardware that does not include such a hardware reset function.

The volatile memory may store control information for controlling a host computer that is monitored by the monitoring apparatus, in addition to data including fault check materials (or fault information) to be retained when the fault is generated. The control information for controlling the host computer may include management parameters, such as various voltage values, a rotational speed of a fan, and the like. The monitoring apparatus may read the fault information from the hardware of the monitoring apparatus for every predetermined time, in order to perform a process to judge whether an abnormal value is reached.

Hence, the monitoring apparatus may be set to a reset state using only the software reset, without using the hardware reset function of the monitoring apparatus.

Next, a description will be given the disclosed reset method and monitoring apparatus in each embodiment, by referring to the drawings.

FIG. 1 is a block diagram illustrating a monitoring apparatus and a host computer in an embodiment of the present invention. A SVP (SerVice Processor) 1 includes a MPU (Micro Processor Unit) 11, a memory controller 12, a volatile memory 13, a nonvolatile memory 14, and a host control interface 15 that are connected as illustrated in FIG. 1. For example, the volatile memory 13 may be formed by a SDRAM (Synchronous Dynamic Random Access Memory), a DDR (Double Data Rate) memory, or the like. For example, the nonvolatile memory 14 may be formed by a NOR type flash memory, a NAND type flash memory, or the like. For example, the host control interface 15 may be formed by a hardware control interface such as a JTAG (Joint Test Action Group) interface, an I2C (Inter-Integrated Circuit) interface, a LAN (Local Area Network) interface, or the like, and may be connected to the host computer 2. The host computer 2 is a monitoring target apparatus that may be formed by a general-purpose computer including a CPU (Central Processing Unit) and a memory, for example. In other words, the host computer 2 is monitored by the SVP 1.

It is assumed for the sake of convenience that an OS (Operating System) of the SVP 1 is the Linux (registered trademark) OS. In addition, a fault refers to a situation in which the Linux OS operating in the SVP 1 executes a panic reboot.

Furthermore, a Linux kernel which will be described later forms a core of the Linux OS having the hierarchical design, and manages the resources of the host computer 2 and also manages the exchange between the hardware (or hardware component) of the SVP 1 and the software (or software component) of the SVP 1.

Figure 2:
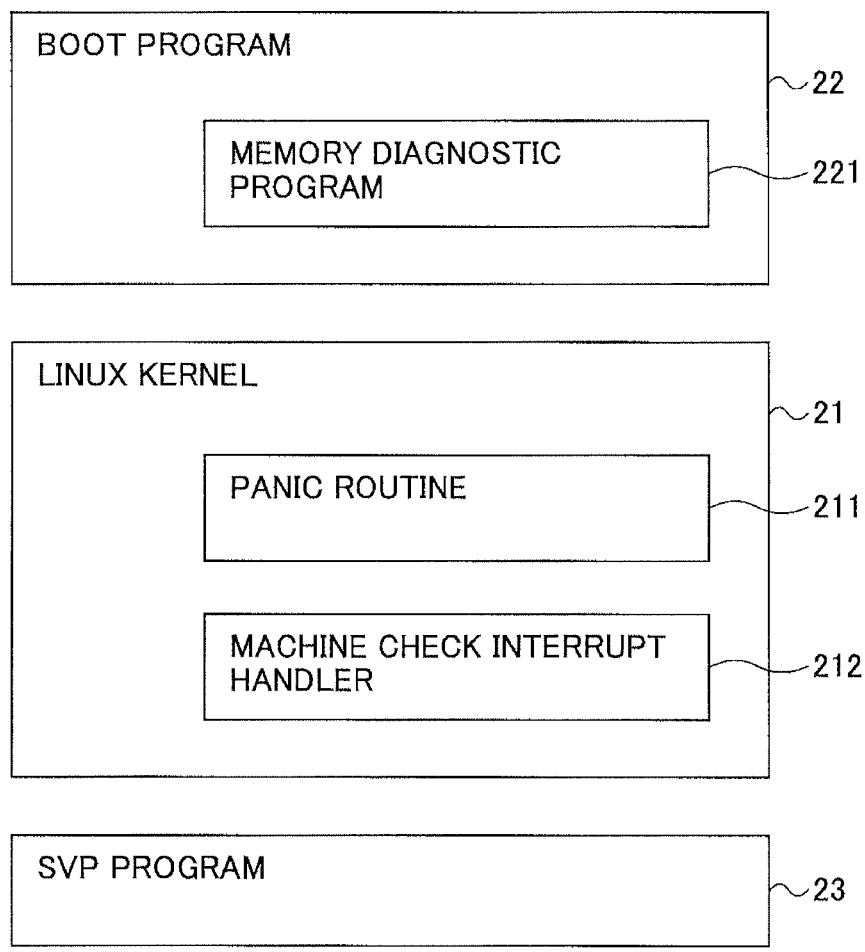
FIG. 2 is a diagram for explaining a software structure within a service processor.

FIG. 2 is a diagram for explaining a software structure within the SVP 1. The software within the SVP 1 includes a Linux kernel 21 included in the Linux OS, a boot program 22, and a SVP program 23. The Linux kernel 21 includes a panic routine 211 and a machine check interrupt handler 212. The panic routine 211 includes a process to execute the software reset which will be described later. The machine check interrupt handler 212 generates a machine check interrupt without performing a hardware reset, even when a hardware abnormality is detected in the hardware of the SVP 1, and causes the software reset to be performed similarly to the panic routine 211. The boot program 22 may read the Linux kernel 21 into the volatile memory 13, and execute the Linux kernel 21. The boot program 22 includes a memory diagnostic program 221 that executes writing of a diagnostic pattern to the volatile memory 13 and reading of the diagnostic pattern from the volatile memory 13. The SVP program 23 executes various processes for realizing the monitoring function of the SVP 1.

The NOR type flash memory usable for the nonvolatile memory 14 may have an upper limit to the number of rewriting or the rewritable number of times, on the order of 100,000 times, for example. From the point of view of minimizing the cost of the SVP 1, it may be difficult to provide the NOR type flash memory having a large storage capacity in the SVP 1 because of the high cost and the slow rewriting operation of the NOR type flash memory. Hence, the NOR type flash memory usable for the nonvolatile memory 14 may be used primarily for storing control programs of the SVP 1. On the other hand, the NAND type flash memory usable for the nonvolatile memory 14 may be inexpensive, and the NAND type flash memory may have an upper limit to the number of rewriting, on the order of 3,000 times to 100,000 times, for example. Consequently, the NAND type flash memory may be unsuited for storing data that is frequently rewritten.

Each program for controlling the hardware of the SVP 1 operates in the Linux kernel 21 included in the Linux OS of the SVP 1. The SVP 1 monitors the hardware of the host computer 2, and reads control information including the management parameters, such as the various voltage values, the rotational speed of the fan, and the like from the hardware of the host computer 2, for every predetermined time of 5 seconds, for example. The SVP 1 stores the control information read from the hardware of the host computer 2 in the volatile memory 13.

The SVP 1 uses the volatile memory 13, which is formed by the SDRAM or the DDR memory, by segmenting the volatile memory 13 into a kernel managing region and a region uncontrollable by kernel. The SVP 1 stores the fault check materials, and the control information including the management parameters, such as the various voltage values, the rotational speed of the fan, and the like. As will be described later in conjunction with FIG. 4, the kernel management region is not used for storing the control information including the management parameters, for the following reasons. The first reason is that the Linux kernel 21 performs a known control using a complex table for converting a virtual address space into a physical address space according to a virtual storage system. The second reason is that the Linux kernel 21 initializes the volatile memory 13 at the time of booting the Linux kernel 21, and the access may be made by the physical address and the access management is simple with respect to the region uncontrollable by the kernel. For these reasons, although the boot program 22 initializes the volatile memory 13, it may be simpler to modify the boot program 22 so as not to initialize the volatile memory 13 at the time of rebooting by the boot program 22, rather than modifying the Linux kernel 21.

When an abnormality such as a contradiction is generated in the SVP 1 and the SVP 1 reboots itself, the panic routine 211 within the Linux kernel 21 is called. This panic routine 211 writes a reset instruction into a known hardware register (not illustrated) within the SVP 1 (for example, within the MPU 11) in order to generate the hardware reset, but in this embodiment, measures are taken so that this hardware reset will not be generated. In other words, the software of the SVP 1 controls the SVP 1 into the reset state, in order to realize a state in which only the software of the SVP 1 is reset without performing the hardware reset.

Figure 3:
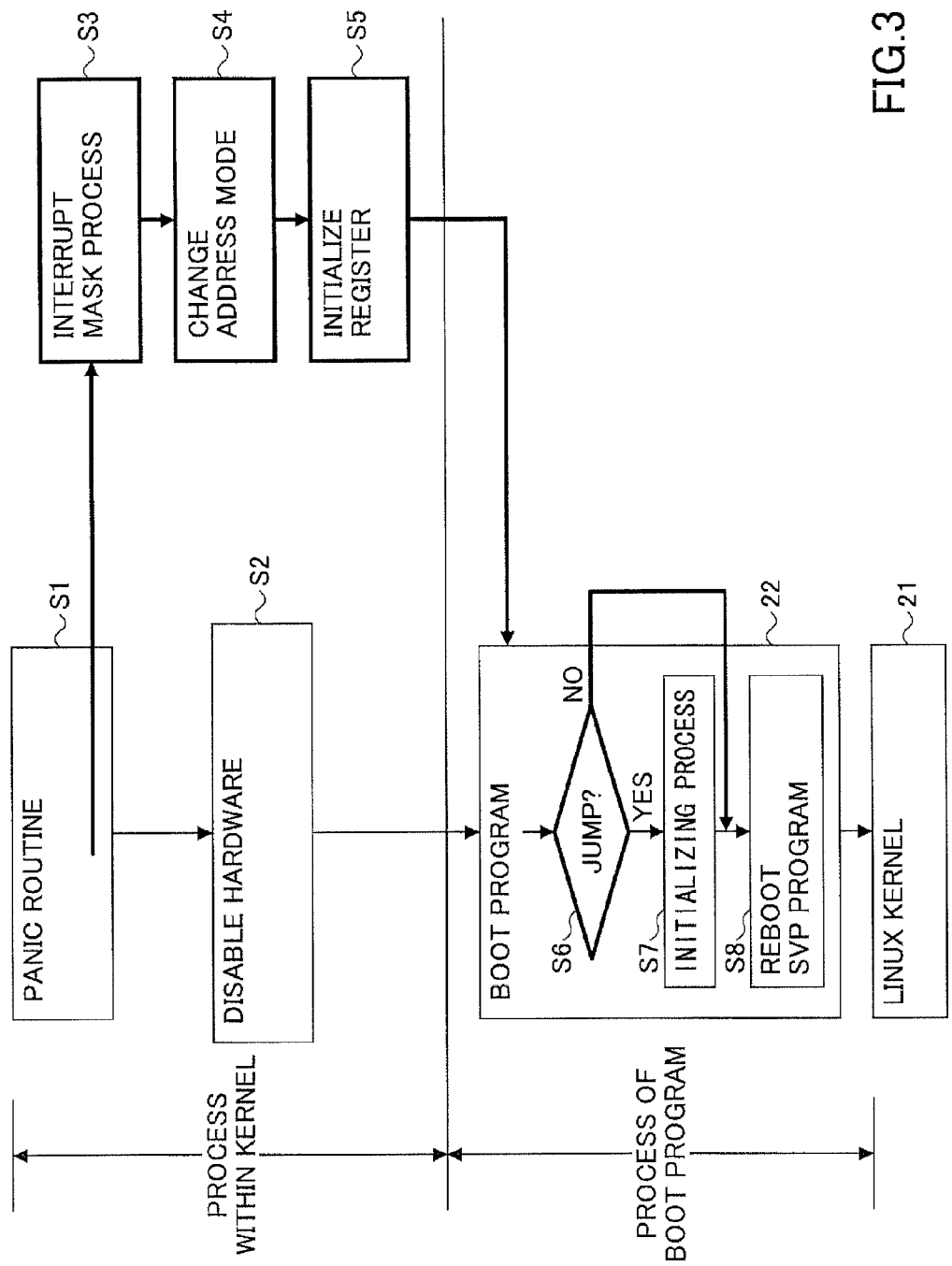
FIG. 3 is a flow chart for explaining a software reset.

FIG. 3 is a flow chart for explaining the software reset. In FIG. 3, processes of steps S1 through S5 are performed by the panic routine 21 within the Linux kernel 21, and processes of steps S6 through S8 are performed by the boot program 22.

It is assumed for the sake of convenience that the SVP 1 is operated while writing in the volatile memory 13 a trace (or fault check materials) that becomes the operation log, and the control information including the management parameters, such as the various voltage values, the rotational speed of the fan, and the like for monitoring the hardware of the SVP 1. In FIG. 3, when the abnormality such as the contradiction is generated within the SVP 1, the step S1 calls the panic routine 211 within the Linux kernel 21.

The step S2 controls the hardware having a possibility of performing an erroneous operation during the software reset, such as a WDT (Watch Dog Timer), to a disabled state by the panic routine 211 within the Linux kernel 21. The WDT is a known timer provided within the MPU 11 and used for monitoring whether the program is executed in a normal manner.

A double panic state would occur to make it impossible to perform a correct operation if a reset were made by the WDT during the software reset. Because an interrupt may not be processed correctly during the software reset even when the interrupt is received, the step S3 performs an interrupt mask process in order to mask the interrupt from the hardware of the SVP 1. The interrupt from the hardware of the SVP 1 may be masked by turning OFF an interrupt enable bit of a PIC (Programmable Interrupt Controller) within the MPU 11. The PIC itself is known, and the PIC controls whether or not to enable the interrupt with respect to the MPU 11.

The step S4 performs an addressing mode changing process in order to change an addressing mode by the panic routine 211 within the Linux kernel 21. Normally, the Linux kernel 21 operates in a logical address space, however, the step S4 changes the addressing mode to the physical addressing mode. The addressing mode is changed to the physical addressing mode because the boot program 22 operates in the physical addressing mode. The Linux kernel 21 also operates in the physical addressing mode until the Linux kernel 21 itself initializes a MMU (Memory Management Unit) within the MPU 11. The MMU itself is known, and the MMU manages utilization states of the volatile memory 13 and the nonvolatile memory 14.

Figure 4:
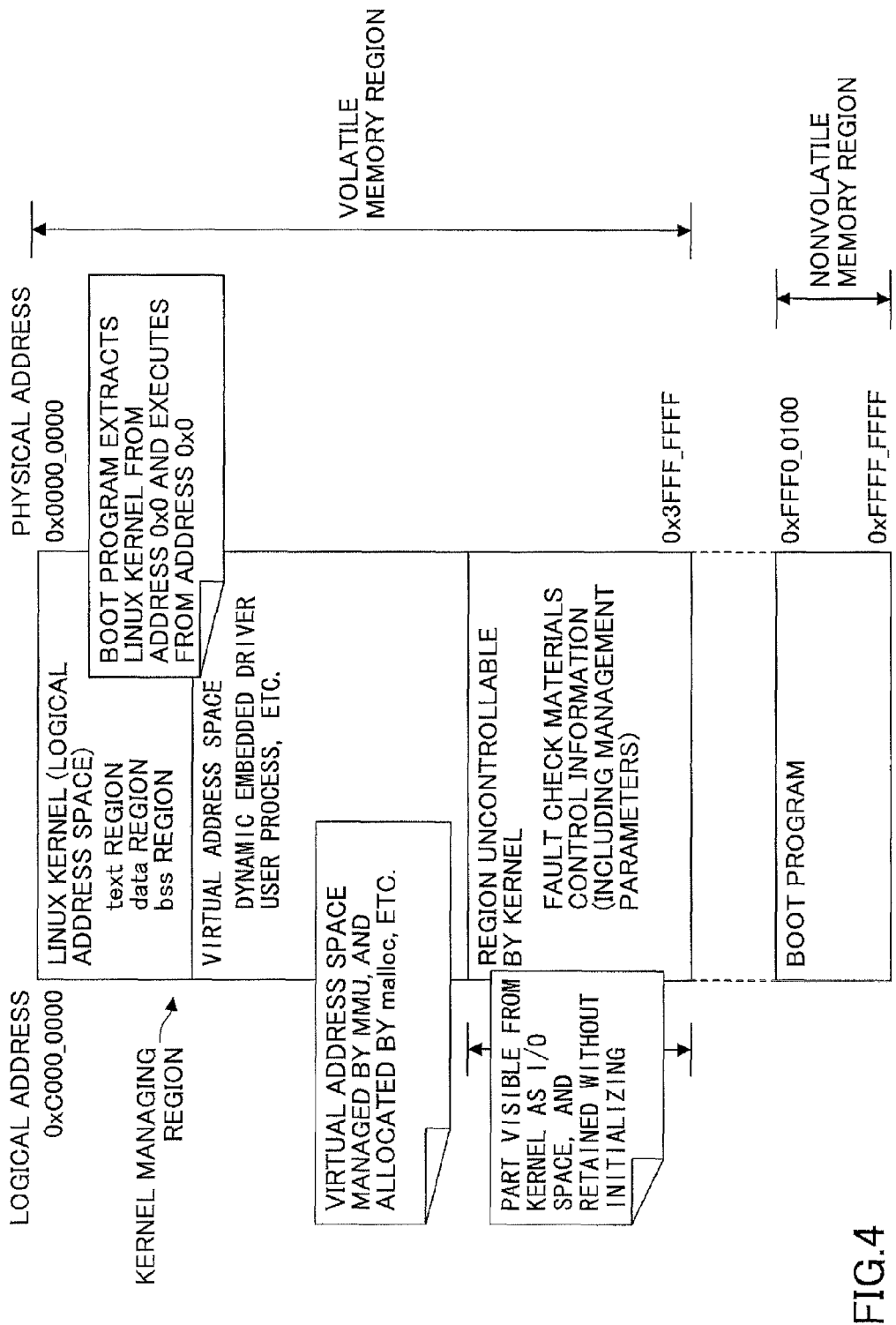
FIG. 4 is a diagram for explaining a memory map within the service processor.

FIG. 4 is a diagram for explaining a memory map within the service processor. As illustrated in FIG. 4, a volatile memory region of the volatile memory 13 is segmented into a kernel managing region and a region uncontrollable by kernel (that is, a region not managed by the kernel). The kernel managing region includes the logical address space of the Linux kernel 21, and the virtual address space. The logical address space includes a text region, a data region, a bss region, and the like. On the other hand, the virtual address space includes a dynamic embedded driver, a user process, and the like. The virtual address space is managed by the MMU, and allocated by a basic function malloc or the like used to secure a memory region. The region uncontrollable by the kernel includes the fault check materials, and the control information including the management parameters. The region uncontrollable by the kernel appears as an I/O (Input and Output) space when viewed from the Linux kernel 21, and this region uncontrollable by the kernel is retained without being initialized when the SVP 1 is rebooted. In addition, the boot program 22 is stored in a nonvolatile memory region of the nonvolatile memory 14. The boot program 22 extracts the Linux kernel 21 from an address 0x0 and executes the Linux kernel 21 from the address 0x0.

A kernel physical address (or kernel region address) and the physical address have a simple correspondence, and the physical address may be obtained by subtracting "0xC000_0000" from the logical address. However, the kernel physical address and the virtual address does not have a 1:1 correspondence because the virtual address is allocated by the Linux kernel 21, and a table is required to perform an address conversion. The software reset is desirably executed in the logical address space in which an easy conversion may be made to the physical address, and in this example, a module does not correspond to a dynamic embedding by a program insmod registered in the Linux kernel 21. The addressing mode may be changed by changing a content of a MSR (Machine State Register) within the MPU 11. The MSR itself is known. The MSR is used to indicate the addressing mode of the MPU 11, and is different from the hardware register described above.

The step S5 performs a register initializing process by the panic routine 211 within the Linux kernel 21 in order to initialize (that is, clear) only the registers used by a processor core within the MPU 11. The registers that are initialized by the register initializing process may also be selected from a table of "e300 Programming Model—Registers" illustrated in FIG. 7-2 of "MPC8379E PowerQUICC II Pro Integrated Host Processor Family Reference Manual". Because the registers that are initialized in this example are included in a supervisor register, a privileged instruction may be used in an assembler. The supervisor register itself is known. The supervisor register is used when the MPU 11 executes computations or operations, and is different from the hardware register described above.

In the step S6, a jump is made from the Linux kernel 21 to a start address of the boot program 22. The start address is "0xFFF0_0100", for example, and may be obtained by causing a counted value of a program counter (not illustrated) within the MPU 11 to jump. The boot program 22 has a function to initialize the volatile memory 13. In addition, in the step S6, the boot program 22 makes a reference to the memory controller 12 before initializing the volatile memory 13, and judges whether the memory controller 12 is in a disabled state. When the memory controller 12 is in the disabled state and the judgement result in the step S26 is YES, it may be judged that the hardware reset is made (that is, the hardware initial state is recognized), and the process advances to the step S7. In the step S7, the boot program 22 performs an initializing process to initialize the volatile memory 13.

On the other hand, when the memory controller 12 is in an enabled state and the judgement result in the step S6 is NO, the it is judged that the software reset is made, and the initializing process of the step S7 to initialize the volatile memory 13 and a diagnostic process is skipped.

In the step S8, the boot program 22 boots the Linux kernel 21, and the Linux kernel 21 reboots the SVP program 23. The rebooted SVP program 23 makes access again to the data in the region uncontrollable by the kernel. Because the data is stored in the region uncontrollable by the kernel in this case, the SVP program 23 may immediately make access to the desired data, without having to perform an initializing process or a formatting.

Only the processor core of the MPU 11 is reset by the software reset by the operation described above, and the software program is executed from the beginning in a state in which the peripheral processors, such as the memory controller 12, are not reset. Hence, only the software is rebooted in this state. Since the peripheral processors and the volatile memory 13 are not reset, the data in the peripheral processors and the volatile memory 13 are retained, such that the data may be accessed again after the resetting of the software.

In the case of the software reset illustrated in FIG. 3, the step S1 calls the panic routine 211 within the Linux kernel 21 when the abnormality such as the contradiction is generated in the SVP 1. However, a step S1A, which detects the hardware abnormality of the hardware within the SVP 1 and generates a machine check interrupt and not the hardware reset, may be executed in place of the step S1. In other words, the machine check interrupt may be generated in order not to perform the hardware reset, not only when the abnormality such as the contradiction is generated in the SVP 1, but also when the hardware abnormality within the SVP 1 is detected. In this case, the machine check interrupt handler 212 generates the machine check interrupt when the hardware abnormality is detected in the hardware of the SVP 1, without performing the hardware reset, and causes the software reset to be performed similarly to the panic routine 211.

Figure 5:
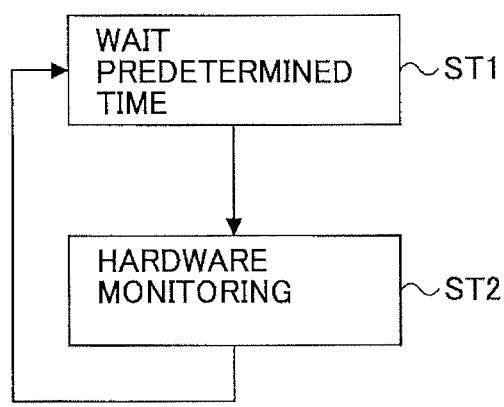
FIG. 5 is a flow chart for explaining a normal operation of the service processor.
Figure 6:
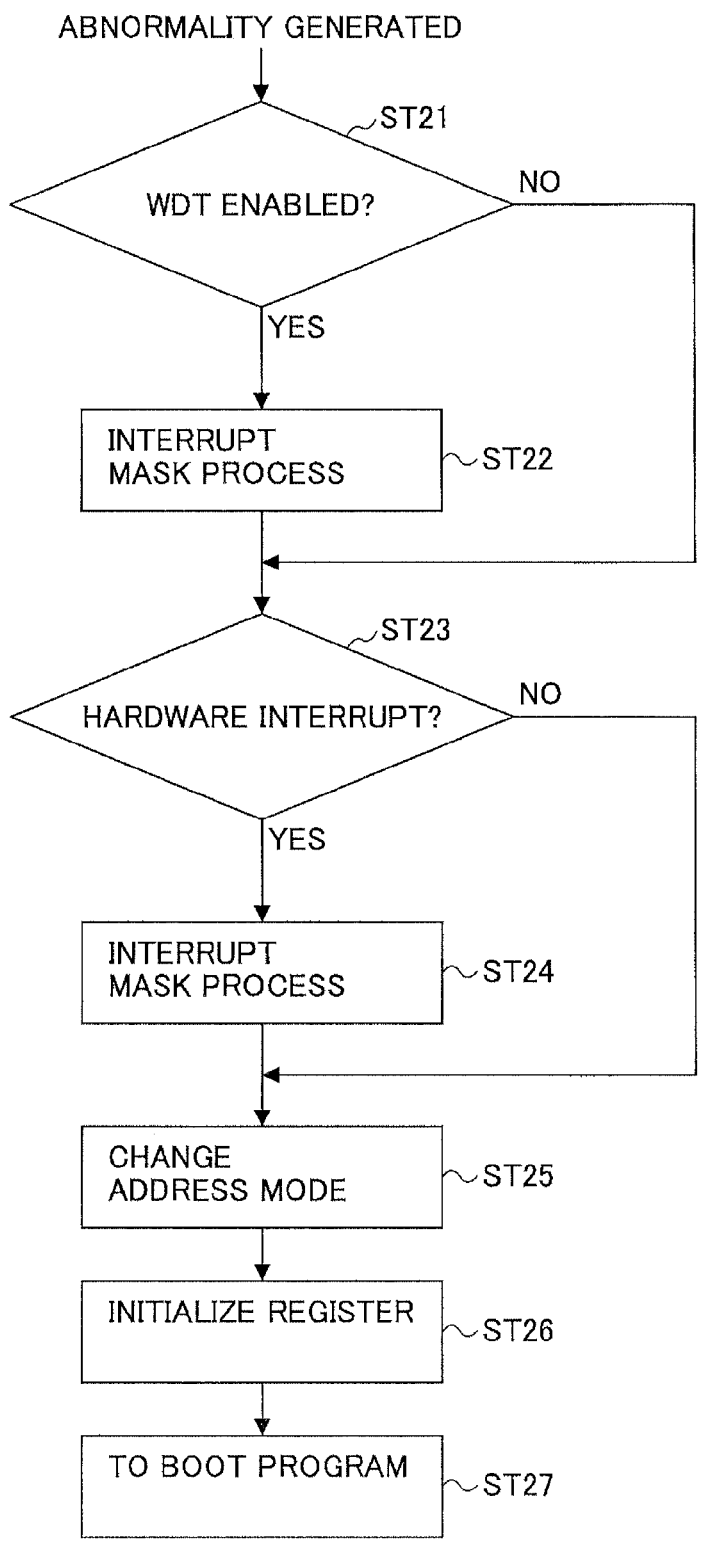
FIG. 6 is a flow chart for explaining a process within a Linux kernel.

Next, a description will be given of the normal operation of the SVP 1, the process within the Linux kernel 21, and the process of the boot program, by referring to FIGS. 5 through 7. FIG. 5 is a flow chart for explaining the normal operation of the SVP 1. FIG. 6 is a flow chart for explaining a process within the Linux kernel 21, and FIG. 7 is a flow chart for explaining a process within the boot program 22.

In a step ST1 illustrated in FIG. 5, the SVP 1 executes a process to wait for a predetermined time. In a step ST2, the SVP 1 executes a process to monitor the hardware within the host computer 2, and the process returns to the step ST1. Hence, the hardware within the host computer 2 is monitored for every predetermined time, and the fault check materials and the control information are stored in the volatile memory 13. In addition, when the abnormality such as the contradiction is generated within the SVP 1 or, when the hardware abnormality of the hardware within the SVP 1 is detected, an abnormality notification is made with respect to the Linux kernel 21.

The process of the Linux kernel 21 illustrated in FIG. 6 is started in response to the abnormality notification from the SVP 1 when the abnormality such as the contradiction is generated within the SVP 1 or, when the hardware abnormality of the hardware within the SVP 1 is detected. A step ST21 judges whether the hardware having a possibility of performing an erroneous operation during the software reset, such as the WDT, is in an enabled state. When the judgement result in the step ST21 is YES, a step ST22 performs the interrupt mask process described above in order to mask the interrupt from the hardware of the SVP 1. When the judgement result in the step ST21 is NO or, after the step ST22, a step ST23 judges whether the hardware abnormality in the hardware within the SVP 1 is detected and a hardware interrupt is generated from the SVP 1 as the abnormality notification. When the judgement result in the step ST23 is YES, a step ST24 performs the interrupt mask process described above in order to mask the interrupt from the hardware of the SVP 1. When the judgement result in the step ST23 is NO or, after the step ST24, a step ST25 changes the addressing mode by the panic routine 211 within the Linux kernel 21. In addition, a step ST26 performs the initializing process described above in order to initialize (that is, clear) only the registers used by the processor core within the MPU 11, by the panic routine 211 within the Linux kernel 21. A step ST27 makes a transition of the process to the process of the boot program 22 illustrated in FIG. 7.

Figure 7:
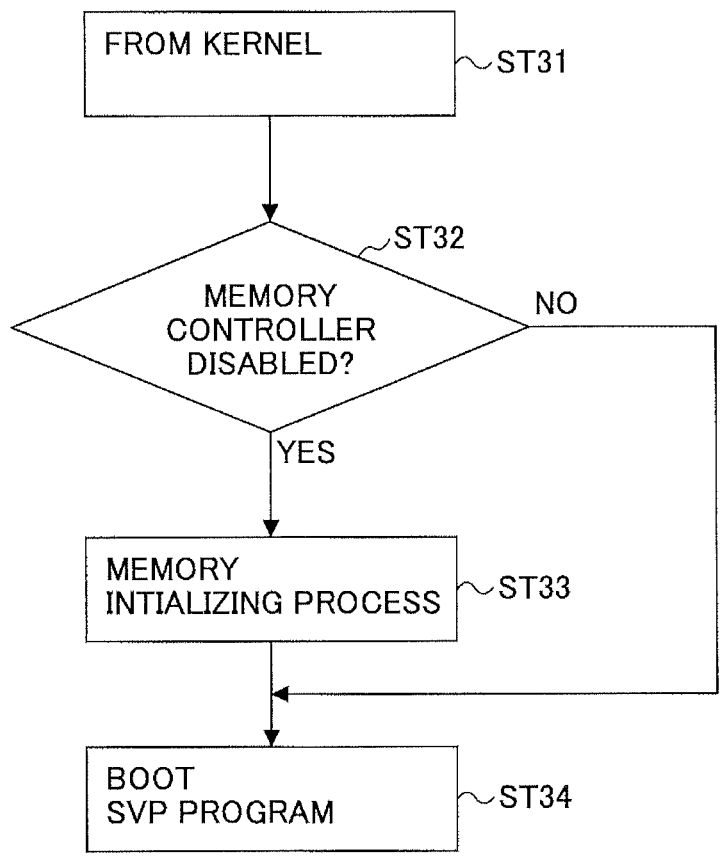
FIG. 7 is a flow chart for explaining a process within a boot program.

The process of the boot program 22 illustrated in FIG. 7 is booted by the Linux kernel 21. In FIG. 7, a step ST31 boots the boot program 22 by the Linux kernel 21. A step ST32 judges whether the memory controller 12 of the SVP 1 is in the disabled state. When the judgement result in the step ST32 is YES, a step ST33 performs the initializing process described above in order to initialize the volatile memory 13, and the volatile memory 13 is cleared. When the judgement result in the step ST32 is NO or, after the step ST33, a step ST34 boots the SVP program 23. Hence, the SVP program 23 that is booted may make access to the data, such as the fault check materials, the control information, and the like, in the region uncontrollable by the kernel within the volatile memory 13. In this case, it is unnecessary to perform an initializing process or a formatting, because the data is stored in the region uncontrollable by the kernel, and the SVP program 23 may immediately make access to the desired data.

In the embodiment described above, it is assumed for the sake of convenience that the OS of the SVP 1 is the Linux OS. However, the OS of the SVP 1 is of course not limited to the Linux OS.

In addition, an aspect of the present invention may be applied to a program that causes a computer to execute a reset method, and to a computer-readable storage medium that stores such a program.

A computer program for causing a processor core of a monitoring apparatus to execute a reset method to reset the monitoring apparatus, may include the following procedures, wherein the monitoring apparatus monitors a host computer, and the monitoring apparatus includes a volatile memory configured to store data, including fault check materials and control information for controlling the host computer. The computer program which, when executed by the processor core, may cause the processor core to perform a process including a procedure causing the processor core to control, to a disabled state, hardware within the monitoring apparatus having a possibility of performing an erroneous operation during a software reset in which the processor core is reset but the volatile memory is not reset when an abnormality is generated within the monitoring apparatus; a procedure causing the processor core to execute the software reset which initializes only registers used by the processor core by masking an interrupt from the hardware; a procedure causing the processor core to initialize the volatile memory when the hardware reset of the monitoring apparatus is performed; a procedure causing the processor core to skip initializing of the volatile memory when the hardware is in an enabled state and the software reset is performed; and a procedure causing the processor core to reboot a processor program that executes a process to realize a monitoring function of the monitoring apparatus.

The computer-readable storage medium may be formed by any kind of recording medium capable of storing the computer program described above in a computer-readable manner.

Further, although the reset method and the monitoring apparatus disclosed herein are described by way of embodiments, the present invention is not limited to these embodiments. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A reset method to reset a monitoring apparatus that is configured to monitor a host computer and includes a volatile memory configured to store data, including fault check materials and control information for controlling the host computer, said reset method causing a processor core of the monitoring apparatus to execute a procedure, the procedure comprising:
controlling, to a disabled state, hardware within the monitoring apparatus having a possibility of performing an erroneous operation during a software reset in which the processor core is reset but the volatile memory is not reset when an abnormality is generated within the monitoring apparatus;
executing the software reset which initializes only registers used by the processor core by masking an interrupt from the hardware;
initializing the volatile memory when a hardware reset of the monitoring apparatus is performed;
skipping initializing of the volatile memory when the hardware is in an enabled state and the software reset is performed; and
rebooting a processor program that executes a process to realize a monitoring function of the monitoring apparatus.

2. The reset method as claimed in claim 1, wherein
the executing the software reset does not reset a peripheral processor within the monitoring apparatus; and
the rebooting the processor program executes the processor program from a beginning in a state in which the data is stored in the volatile memory, in order to obtain a state in which only software of the monitoring apparatus is rebooted.

3. The reset method as claimed in claim 1, wherein
software of the monitoring apparatus includes a kernel included in an operating system, a boot program to read the kernel into the volatile memory and to execute the kernel, and the processor program; and
the executing the software reset is executed by the kernel.

4. The reset method as claimed in claim 3, wherein the executing the software reset is executed by a routine, within the kernel, that is called when the abnormality is a contradiction within the monitoring apparatus, and is executed by a machine check handler within the kernel without performing the hardware reset when the abnormality is a hardware abnormality of the hardware within the monitoring apparatus.

5. The reset method as claimed in claim 1, wherein
the volatile memory includes a kernel managing region including a logical address space and a virtual address space, and a region uncontrollable by kernel and configured to store the data; and
the processor program, that is rebooted, again makes access to the data stored in the region uncontrollable by the kernel.

6. A monitoring apparatus comprising:
a processor core configured to monitor a host computer; and
a volatile memory configured to store data including fault check materials obtained by monitoring the host computer by the processor core, and control information to control the host computer,
wherein the processor core controls, to a disabled state, hardware within the monitoring apparatus having a possibility of performing an erroneous operation during a software reset in which the processor core is reset but the volatile memory is not reset when an abnormality is generated within the monitoring apparatus; executes the software reset which initializes only registers used by the processor core by masking an interrupt from the hardware; initializes the volatile memory when a hardware reset of the monitoring apparatus is performed; skips initializing of the volatile memory when the hardware is in an enabled state and the software reset is performed; and reboots a processor program that executes a process in order to realize a monitoring function of the monitoring apparatus.

7. The monitoring apparatus as claimed in claim 6, wherein
the executes the software reset does not reset a peripheral processor within the monitoring apparatus; and
the reboots the processor program executes the processor program from a beginning in a state in which the data is stored in the volatile memory, in order to obtain a state in which only software of the monitoring apparatus is rebooted.

8. The monitoring apparatus as claimed in claim 6, wherein
software of the monitoring apparatus includes a kernel included in an operating system, a boot program to read the kernel into the volatile memory and to execute the kernel, and the processor program; and
the executes the software reset is executed by the kernel.

9. The monitoring apparatus as claimed in claim 8, wherein the executes the software reset is executed by a routine, within the kernel, that is called when the abnormality is a contradiction within the monitoring apparatus, and is executed by a machine check handler within the kernel without performing the hardware reset when the abnormality is a hardware abnormality of the hardware within the monitoring apparatus.

10. The monitoring apparatus as claimed in claim 6, wherein
the volatile memory includes a kernel managing region including a logical address space and a virtual address space, and a region uncontrollable by kernel and configured to store the data; and
the processor program, that is rebooted, again makes access to the data stored in the region uncontrollable by the kernel.

* * * * *